(12) United States Patent
Takeo et al.

(10) Patent No.: US 6,713,729 B2
(45) Date of Patent: Mar. 30, 2004

(54) ELECTRIC LOAD CONTROL SYSTEM AND VEHICLE AIR-CONDITIONING SYSTEM HAVING THE SAME

(75) Inventors: Yuji Takeo, Toyoake (JP); Ken Matsunaga, Kariya (JP); Hisashi Ieda, Nagoya (JP); Mitsuyo Oomura, Hekinan (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 10/093,679

(22) Filed: Mar. 8, 2002

(65) Prior Publication Data
US 2002/0125859 A1 Sep. 12, 2002

(30) Foreign Application Priority Data

Mar. 12, 2001 (JP) .......................................... 2001-069191
Mar. 12, 2001 (JP) .......................................... 2001-069192

(51) Int. Cl.$^7$ ................................................ H05B 3/02
(52) U.S. Cl. ........................................ 219/485; 219/490
(58) Field of Search ................................ 219/482, 483, 219/484, 485, 486, 490, 492, 497, 200, 202; 307/10.7, 10.6, 131, 38, 18; 322/7; 320/131, 135; 361/63, 94; 165/42, 43, 202

(56) References Cited

U.S. PATENT DOCUMENTS

| 4,323,837 A | * | 4/1982 | Nakamura et al. ............. 322/7 |
| 5,856,711 A | * | 1/1999 | Kato et al. .................. 307/10.6 |
| 5,959,368 A | * | 9/1999 | Kubo et al. ................... 307/18 |
| 6,059,197 A | | 5/2000 | Kurahashi et al. ..... 237/12.3 R |
| 6,070,650 A | | 6/2000 | Inoue et al. .................. 165/42 |

FOREIGN PATENT DOCUMENTS

JP    52-54150    5/1977

* cited by examiner

Primary Examiner—Tu Ba Hoang
(74) Attorney, Agent, or Firm—Harness, Dickey & Pierce, PLC

(57) ABSTRACT

In a vehicle air-conditioning system, a supply of electric power to a first electric heater and a supply of electric power to a second electric heater are duty controlled at the same duty ratio in such a manner that the supply of the electric power to the second electric heater is phase shifted by one half of a period from the supply of the electric power to the first electric heater.

14 Claims, 4 Drawing Sheets

ELECTRIC LOAD CONTROL SYSTEM AND VEHICLE AIR-CONDITIONING SYSTEM HAVING THE SAME

CROSS REFERENCE TO RELATED APPLICATION

This application is based on and incorporates herein by reference Japanese Patent Application No. 2001-69192 filed on Mar. 12, 2001 and Japanese Patent Application No. 2001-69191 filed on Mar. 12, 2001.

BACKGROUND OF THE INVENTION

1. Field of the Invention

The present invention relates to a control system for controlling an electric load, which is driven by electric power supplied from a battery. The present invention particularly relates to such a control system suitable for a vehicle air conditioning system, which air-conditions a passenger room of a vehicle.

2. Description of Related Art

Japanese Unexamined Patent Publication No. 10-157445 discloses a vehicle air conditioning system, which has an electric heater (electric load) driven by electric power supplied from a vehicle battery. Performance of the electric heater is controlled by an electromagnetic relay and an inverter. Furthermore, Japanese Unexamined Patent Publication No. 11-78488 discloses a vehicle air-conditioning system, which has an electric heater driven by electric power supplied from a vehicle battery. It is well known to charge the vehicle battery with the electric power generated by an electric power generating means.

In the above prior art systems, a voltage of the battery largely fluctuates depending on its charge/discharge state. Thus, when the voltage of the battery becomes excessively high, the electric current supplied to the electric heater becomes excessively high. This causes blowing of a fuse connected between the battery and the electric heater. When the fuse is blown, the electric heater can not be used until the blown fuse is replaced with a new one.

Furthermore, in the above systems, when a supply of electric power to each of the electric loads is simultaneously initiated or is simultaneously terminated, a large fluctuation in the voltage of the battery occurs due to a large fluctuation in an electric current at the start or end of the supply of the electric power to each of the electric loads. The large fluctuation in the voltage of the battery can induce a malfunction of another electric load or can deteriorate durability of the electric loads.

SUMMARY OF THE INVENTION

Thus, it is an objective of the present invention to address the above disadvantages.

To address the objective of the present invention, there is provided an electric load control system, which charges a battery with electric power generated by an electric power generating means and supplies electric power from the battery to a plurality of electric loads through a fuse. The electric load control system includes a control means, which controls a supply of the electric power to each of the electric loads such that an electric current to the fuse is equal to or less than a tolerable electric current level of the fuse. The supply of the electric power to each of the electric loads is duty controlled by the control means in such a manner that the supply of the electric power to one of the electric loads is phase shifted from the supply of the electric power to another one of the electric loads.

To address the objective of the present invention, there is alternatively provided an electric load control system, which charges a battery with electric power generated by an electric power generating means and supplies electric power from the battery to a plurality of electric loads. The electric load control system includes a control means, which controls a supply of the electric power to each of the electric loads. The supply of the electric power to each of the electric loads is duty controlled by the control means in such a manner that the supply of the electric power to one of the electric loads is phase shifted from the supply of the electric power to another one of the electric loads, so that each power-on time and each power-off time of the one of the electric loads are shifted from each corresponding power-on time and each corresponding power-off time of the other one of the electric loads, respectively.

To address the objective of the present invention, there is also provided an air-conditioning system of a vehicle, which includes any one of the above electric load control systems.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
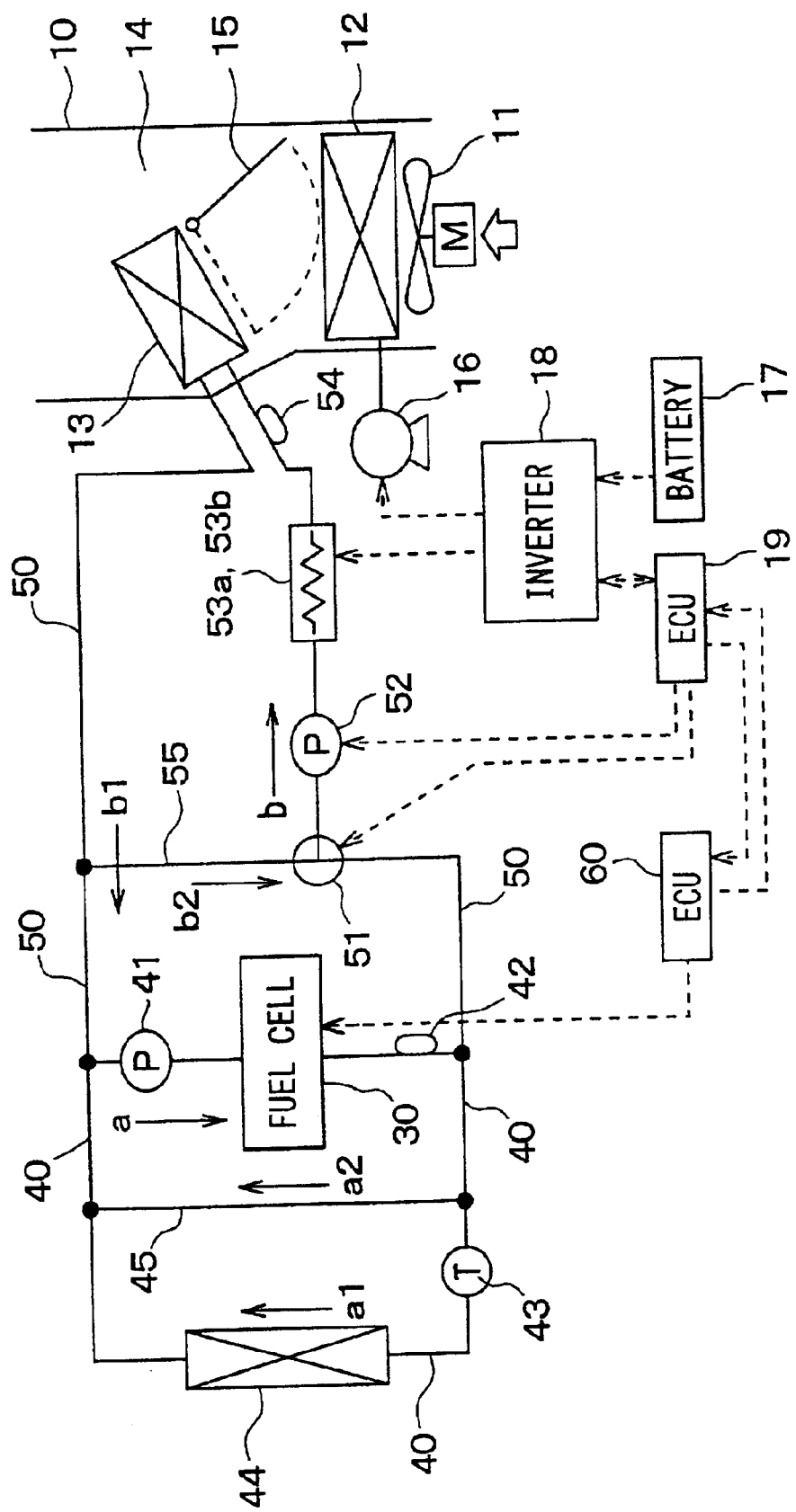
FIG. 1 is a schematic view, showing a vehicle air-conditioning system according to an embodiment of the present invention.

An embodiment of the present invention will be described with reference to the accompanying drawings. In this embodiment, the present invention is embodied in an air-conditioning system of a vehicle, which has an electric vehicle drive motor (not shown) as a drive source for driving the vehicle. FIG. 1 schematically shows a structure of the vehicle air-conditioning system.

With reference to FIG. 1, a blower 11 is arranged in an air duct 10. The blower 11 blows inside air, which is suctioned from a vehicle passenger room through an inside air inlet (not shown), or outside air, which is suctioned from outside of the vehicle through an outside air inlet (not shown). An evaporator 12 is arranged downstream of the blower 11. The evaporator 12 cools the blown air (hereinafter, the blown air will be referred to as the conditioning air) through heat exchange with coolant.

A heater core 13 is arranged downstream of the evaporator 12. The heater core 13 heats the conditioning air, which has been cooled through the evaporator 12, via heat exchange with warmer coolant. The heater core 13 is arranged to close about one half of a passage opening of the air duct 10, and a bypass air passage 14 is arranged in parallel to the heater core 13. An air mix damper 15 is pivotably arranged upstream of the heater core 13. The air mix damper 15 adjusts a ratio between an amount of the conditioning air, which passes through the heater core 13, and an amount of the conditioning air, which passes through the bypass air passage 14, to adjust a temperature of the conditioning air blown into to the vehicle passenger room.

A defroster outlet, a face-side outlet and a foot-side outlet are arranged farthest downstream of the air duct 10. The defroster outlet supplies a flow of the conditioning air having the adjusted temperature toward a windshield. The face-side outlet supplies a flow of the conditioning air toward an upper half of a passenger's body. The foot-side outlet supplies a flow of the conditioning air toward feet of the passenger.

An electric compressor (acting as an electric load) 16 for compressing and discharging refrigerant constitutes a refrigeration cycle in cooperation with the evaporator 12, a condenser (not shown), an expansion valve (not shown) and others. The electric compressor 16 includes a compressing mechanism portion and an alternating-current (AC) motor. The compressing mechanism portion of the electric compressor 16 compresses and then discharges the refrigerant, and the AC motor drives the compressing mechanism portion. Direct current (DC) power supplied from a vehicle battery 17 (in this embodiment, this is the DC power source with a rated voltage of 300 V) is converted to AC power through an inverter 18 and is supplied to the AC motor of the electric compressor 16.

The battery 17 is charged by a fuel cell (acting as an electric power generating means) 30, which generates the electrical power through a chemical reaction between hydrogen and oxygen.

A first coolant circuit 40 is provided to maintain a temperature of the fuel cell 30 within a predetermined temperature range. A first water pump 41, the fuel cell 30, a first coolant temperature sensor 42, a thermostat 43 and a radiator 44 are arranged in the first coolant circuit 40. The first water pump 41 pumps and circulates the coolant in a direction of arrow a. The first coolant temperature sensor 42 measures a temperature of the coolant, which has passed through the fuel cell 30. Thermostat 43 opens and closes the first coolant circuit 40 based on the coolant temperature. The radiator 44 allows heat exchange between the coolant and the outside air. A first bypass coolant circuit 45 connects a portion of the first coolant circuit 40, which is located upstream of the first water pump 41, and another portion of the first coolant circuit 40, which is located downstream of the fuel cell 30.

When the temperature of the coolant is increased and becomes equal to or greater than a predetermined upper limit temperature, the thermostat 43 opens, so that the coolant flows through the radiator 44 in a direction of arrow a1 and is cooled therethrough. On the other hand, when the temperature of the coolant is decreased and becomes equal to or less than a predetermined lower limit temperature, the thermostat 43 closes, so that the flow of the coolant toward the radiator 44 is stopped, and the coolant is returned to the first water pump 41 side through the first bypass coolant circuit 45 in a direction of arrow a2. With the above described operation of the thermostat 43, the temperature of the fuel cell 30 is maintained within a predetermined temperature range, in which high power generation efficiency is achieved.

The warm coolant, which has been heated by the heat generated in the fuel cell 30, is supplied to the heater core 13 through a second coolant circuit 50, so that the heat, which is generated in the fuel cell 30, is used for the air-conditioning. One end of the second coolant circuit 50 is connected to the first coolant circuit 40 on the downstream side of the fuel cell 30. The other end of the second coolant circuit 50 is connected to the first coolant circuit 40 on the upstream side of the first water pump 41.

A three-way valve 51, a second electric water pump 52, two electric heaters (acting as electric loads, see FIG. 2 for greater detail) 53a, 53b, a second coolant temperature sensor 54 and the heater core 13 are arranged in the second coolant circuit 50. The three-way valve 51 changes the flow of the coolant within the second coolant circuit 50. The second water pump 52 pumps and circulates the coolant in a direction of arrow b. The electric heaters 53a, 53b heat the coolant. The second coolant temperature sensor 54 measures a temperature of the coolant, which has passed through the electric heaters 53a, 53b. A second bypass coolant circuit 55 branches off from the second coolant circuit 50 on the downstream side of the heater core 13 and is connected to the three-way valve 51.

The DC power supplied from the battery 17 is duty controlled through the inverter 18 and is then supplied to the first and second electric heaters 53a, 53b. The first and second electric heaters 53a, 53b are sheathed heaters, which include a Nichrome line. In this embodiment, electrical characteristics of each electric heater 53a, 53b include a resistance of 30 Ω, a rated voltage of 300 V and a rated electric power of 3 kW.

An air-conditioning electronic control unit (ECU) 19 includes a known microcomputer, which has a CPU, a ROM and a RAM (not shown). The air-conditioning ECU 19 executes various computing operations based on input signals through use of programs and maps stored in the microcomputer. Then, the air-conditioning ECU 19 controls the air mix damper 15, the inverter 18, the three-way valve 51, the second water pump 52, and the first and second electric heaters 53a, 53b to conducts predetermined air-conditioning control operations based on the computed results.

A vehicle electronic control unit (ECU) 60 includes a known microcomputer, which has a CPU, a ROM and a RAM (not shown). The vehicle ECU 60 executes various computing operations based on input signals through use of programs and maps stored in the microcomputer. The vehicle ECU 60 controls the electric vehicle drive motor based, for example, on an accelerator pedal position (not shown). The vehicle ECU 60 also controls an amount of electrical power generated in the fuel cell 30 based on a charge/discharge state of the battery 17. Information signals are exchanged between the vehicle ECU 60 and the air-conditioning ECU 19.

Figure 2:
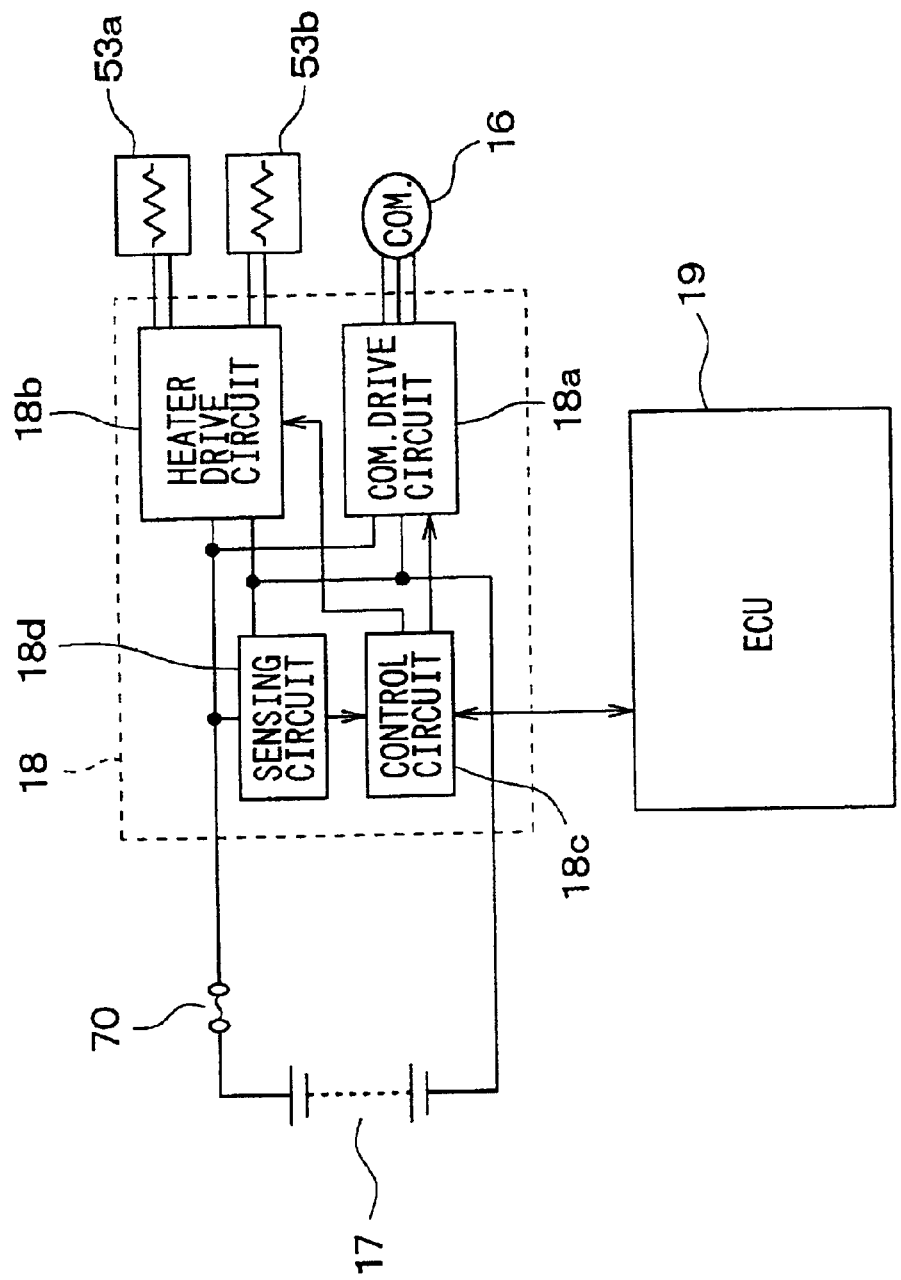
FIG. 2 is a block diagram, showing an electric circuit arrangement of the vehicle air-conditioning system of FIG. 1.

The inverter 18 will be further described with reference to FIG. 2. The DC power of the battery 17 is supplied to the inverter 18 through a fuse 70. The inverter 18 generates the AC output (AC power) of a variable frequency through a switching operation of the DC power using a compressor drive circuit 18a. A rotational speed of the electric compressor 16 is variably controlled with the AC output supplied from the inverter 18.

The inverter 18 also carries out the duty control of the power supplied to the first and second electric heaters 53a, 53b through a switching operation of the DC power using a heater drive circuit 18b. Through this duty control, the first and second electric heaters 53a, 53b are supplied with a voltage, which is substantially the same as that of the battery 17, through the heater drive circuit 18b. In this embodiment, a switching element used in the compressor drive circuit 18a and a switching element used in the heater drive circuit 18b are transistors (e.g., IGBTs).

The inverter 18 further includes a control circuit 18c and a voltage sensing circuit 18d. The control circuit 18c controls operations of the compressor drive circuit 18a and the heater drive circuit 18b based on instructions received from the air-conditioning ECU 19. The voltage sensing circuit 18d measures the voltage of the battery 17 and outputs a voltage signal indicative of the measured voltage of the battery 17 to the air-conditioning ECU 19. Thus, the inverter 18 and the air-conditioning ECU 19 constitute a control means for controlling the power supply to the electric loads (electric compressor 16 and the first and second electric heaters 53a, 53b).

Figures 3A, 3B, 3C:
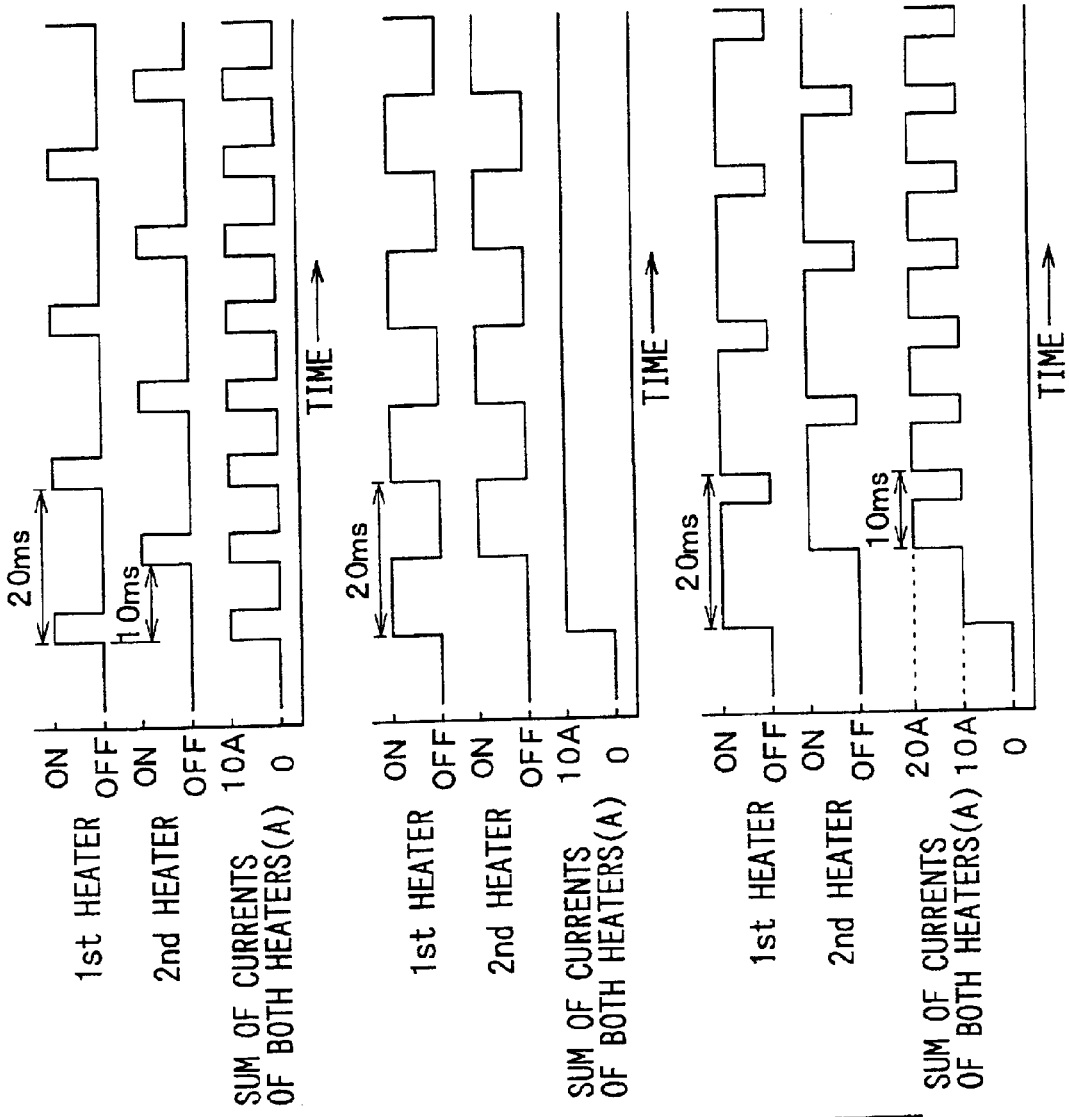
FIG. 3A is a graph, showing duty control of first and second electric heaters, which are operated at a duty ratio of 20%.
FIG. 3B is a graph, showing duty control of first and second electric heaters, which are operated at a duty ratio of 50%.
FIG. 3C is a graph, showing duty control of first and second electric heaters, which are operated at a duty ratio of 80%.

FIGS. 3A to 3C show the duty control operations of the first and second electric heaters 53a, 53b at various duty ratios as well as the sum of the electric current of the first electric heater 53a and the electric current of the second electric heater 53b with respect to time. In the present embodiment, one period of the duty control operation of each electric heater 53a, 53b is 20 milliseconds (ms), and each power-on time of the second electric heater 53b is delayed by 10 ms from each corresponding power-on time of the first electric heater 53a. In other words, the supply of the electric power to the first electric heater 53a and the supply of the electric power to the second electric heater 53b are carried out in such a manner that the phase of the duty control of the second electric heater 53b is delayed by one half of the period from the phase of the duty control of the first electric heater 53a.

Furthermore, the first electric heater 53a is controlled at the same duty ratio as that of the second electric heater 53b, so that each power-off time of the second electric heater 53b is also delayed by the one half of the period (in this embodiment, the one half of the period is 10 ms) from each corresponding power-off time of the first electric heater 53a.

When the phase of the duty control of the second electric heater 53b is delayed by the one half of the period from the phase of the duty control of the first electric heater 53a, and the duty ratio of each electric heater 53a, 53b is set to 50% or less, there is no overlap time, in which both the first electric heater 53a and the second electric heater 53b are powered on, as shown in FIGS. 3A and 3B. That is, only one of the first and second electric heaters 53a, 53b is powered on at any given moment.

Thus, a maximum value of the sum of the electric current of the first electric heater 53a and the electric current of the second electric heater 53b is equal to the electric current (in this embodiment, the electric current is 10 A at 300 V) of the first electric heater 53a or of the second electric heater 53b. That is, the maximum value of the sum of the electric current of the first electric heater 53a and the electric current of the second electric heater 53b, which is obtained with the provision of the phase delay of the duty control, becomes one half of the maximum value (20 A) of the sum of the electric current of the first electric heater 53a and the electric current of the second electric heater 53b, which is obtained without the provision of the phase delay of the duty control.

With reference to FIG. 3C, when the duty ratio is greater than 50%, a change in the sum of the electric current of the first electric heater 53a and the electric current of the second electric heater 53b is equal to the electric current (in this embodiment, the electric current is 10 A at 300 V) of the first electric heater 53a or of the second electric heater 53b. That is, at the duty ratio greater than 50%, the change in the sum of the electric current of the first electric heater 53a and the electric current of the second electric heater 53b, which is obtained with the provision of the phase delay of the duty control, becomes one half of the change (20 A) in the sum of the electric current of the first electric heater 53a and the electric current of the second electric heater 53b, which is obtained without the provision of the phase delay of the duty control, as shown in FIG. 3C.

The operation of the vehicle air-conditioning system, which has the above structure, will be described.

Various signals indicative of an engine coolant temperature, an inside air temperature inside the passenger room, an outside air temperature outside the passenger room, an amount of solar radiation falling into the passenger room, a desired inside air temperature inside the passenger room and the like are supplied to the air-conditioning ECU 19. Furthermore, signals from the voltage sensing circuit 18d of the inverter 18, the first coolant temperature sensor 42 and the second coolant temperature sensor 54 are supplied to the air-conditioning ECU 19.

Based on the supplied signals, the air-conditioning ECU 19 computes a target outlet air temperature of the air to be blown into the passenger room. Then, the air-conditioning ECU 19 controls the air mix damper 15, the electric compressor 16, the inverter 18, the three-way valve 51, the second water pump 52, the first electric heater 53a, the second electric heater 53b and the like in such a manner that an actual outlet air temperature of the air to be blown into the passenger room substantially coincides with the target outlet air temperature.

First, when an air-conditioning switch (not shown), which actuates or stops the air-conditioning system, is turned on, the air-conditioning ECU 19 actuates the second water pump 52 and switches the flow of the coolant within the second coolant circuit 50 by controlling the three-way valve 51 based on the output signal of the first coolant temperature sensor 42.

Specifically, when the temperature of the coolant, which has passed through the fuel cell 30, is raised to the predetermined temperature or higher, and thus the conditioning air can be heated with the heat released from the fuel cell 30, the second coolant circuit 50 and the second bypass coolant circuit 55 are discommunicated from one another by operating the three-way valve 51. Thus, the circuit, which connects the fuel cell 30, the first electric heater 53a, the second electric heater 53b and the heater core 13, is established. As a result, the coolant, which has passed through the fuel cell 30, flows through the first electric heater 53a, the second electric heater 53b and the heater core 13 and is then returned to the fuel cell 30 side in a direction of b1. At this time, the coolant is not required to be heated by the first and second electric heaters 53a, 53b, so that the first and second electric heaters 53a, 53b are not energized.

On the other hand, when the temperature of the coolant, which has passed through the fuel cell 30, is less than the predetermined temperature, the second bypass coolant circuit 55 and the upstream side of the water pump 52 are communicated with each other, and the second bypass coolant circuit 55 and the downstream side of the fuel cell 30 are discommunicated from one another. Thus, the coolant, which has passed through the heater core 13, is prevented from flowing toward the fuel cell 30 and is returned to the second water pump 52 side through the second bypass coolant circuit 55 in a direction of arrow b2. At this time, the supply of the electric power to each of the first and second electric heaters 53a, 53b is controlled based on the output signal of the second coolant temperature sensor 54 in such a manner that the temperature of the coolant supplied to the heater core 13 is adjusted to the predetermined temperature.

Next, relevant portions of the control operations in the air-conditioning ECU 19, which are relevant to the control of the first and second electric heaters 53a, 53b, will be described with reference to a flowchart shown in FIG. 4.

First, terminology used in FIG. 4 and the following description will be described. A required electric power HOreq (W) is an electric power required by the first and second electric heaters 53a, 53b and the electric compressor 16 to adjust the actual outlet air temperature to the target outlet air temperature. The required electric power HOreq is computed by the air-conditioning ECU 19 and is outputted to the vehicle ECU 60.

An allowed electric power W (W) is an electric power that is allowed to be used in the air-conditioning system in view of the electric power load on the vehicle side (e.g., electrical power consumption of the electric vehicle drive motor). The allowed electric power W is computed by the vehicle ECU 60 and is outputted to the air-conditioning ECU 19.

A necessary heater electric power HO (W) is the sum of the electric power of the first electric heater 53a and the electric power of the second electric heater 53b required to adjust the actual outlet air temperature to the target outlet air temperature. A maximum heater electric power Ht (W) is the sum (in the present embodiment, this is 6 kW) of a rated electric power of the first electric heater 53a and a rated electric power of the second electric heater 53b. A rated voltage Vt (V) is a rated voltage (in this embodiment, this is 300 V) of the first and second electric heaters 53a, 53b.

A power source voltage Vin (V) is a voltage (=an applied voltage that is applied to the first and second electric heaters 53a, 53b) of the battery 17 measured with the voltage sensing circuit 18d of the inverter 18. A heater stop voltage Vh (V) is a voltage (in this embodiment, this is 400 V) that is set to be higher than the rated voltage of the first and second electric heaters 53a, 53b for the purpose of protecting the first and second electric heaters 53a, 53b.

A target duty ratio HOduty (%) is a duty ratio of the first and second electric heaters 53a, 53b eventually determined by the air-conditioning ECU 19. A first duty ratio HOduty1 (%) is a temporary duty ratio of the first and second electric heaters 53a, 53b, which is computed by the air-conditioning ECU 19 to limit the sum of the electric power of the first electric heater 53a and the electric power of the second electric heater 53b to the maximum heater electric power Ht or less. A second duty ratio HOduty2 (%) is a temporary duty ratio of the first and second electric heaters 53a, 53b, which is computed by the air-conditioning ECU 19 for the purpose of protecting the fuse 70 and the like.

A heater resistance R (Ω) is a resistance (in this embodiment, this is 30 Ω) of the first and second electric heaters 53a, 53b. A tolerable fuse electric current Id (A) is the maximum electric current (in this embodiment, this is 30 A) that does not cause blowing of the fuse 70. A compressor electric current Ic (A) is an electric current consumed by the electric compressor 16.

An allowed heater electric power HOok is an electric power obtained by subtracting the compressor electric power (=Vt*Ic) from the allowed electric power W. A usable heater electric power HOf is a usable electric power of the first and second electric heaters 53a, 53b, which is eventually determined by the air-conditioning ECU 19.

Figure 4:
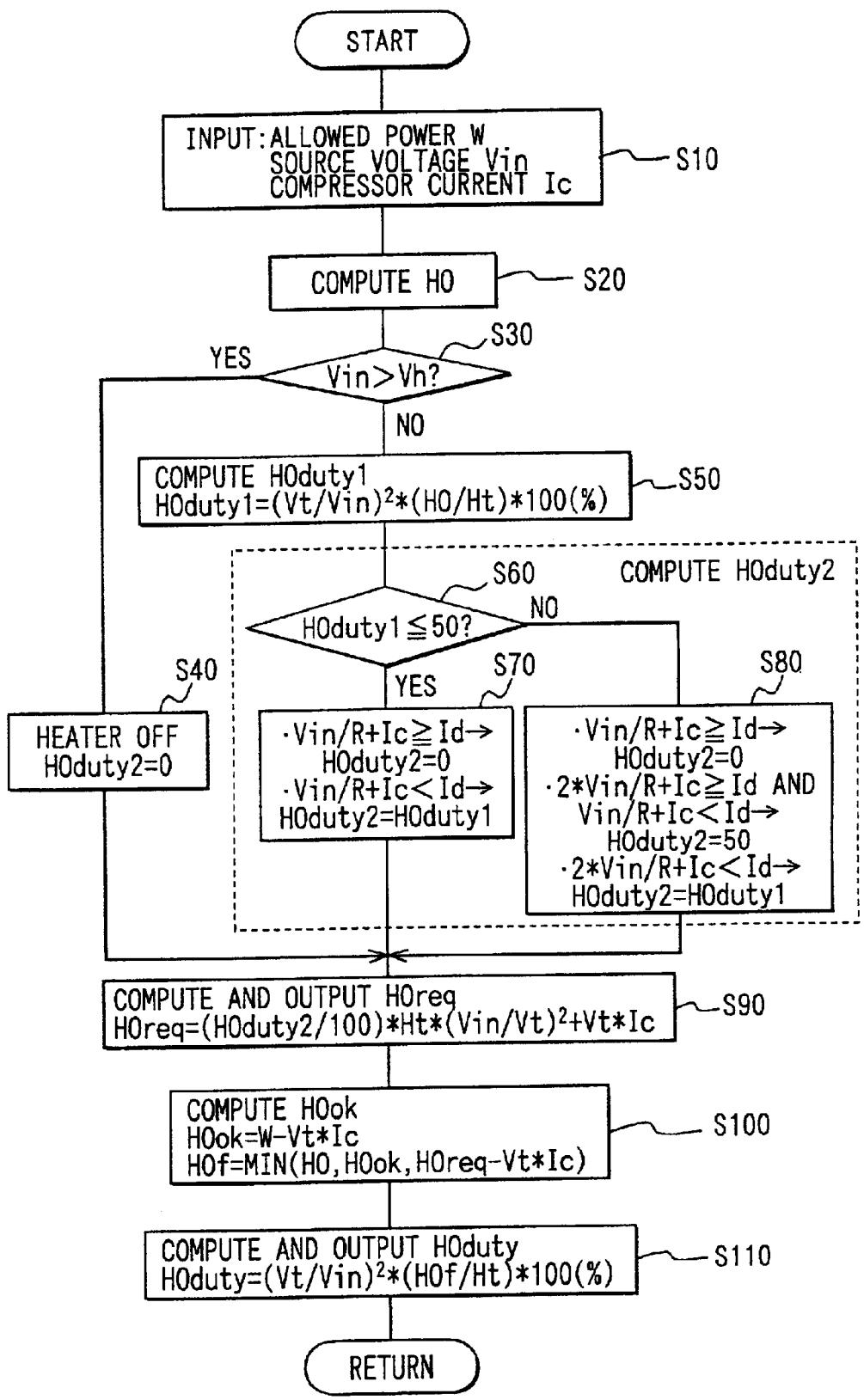
FIG. 4 is a flowchart, showing a control operation carried out in an air-conditioning ECU of the vehicle air-conditioning system of FIG. 1.

Prior to the control operation of FIG. 4, the activation or deactivation of the electric compressor 16 has been already determined. At step S10 of FIG. 4, the compressor electric current Ic, the allowed electric power W and the power source voltage Vin are inputted from the vehicle ECU 60 to the air-conditioning ECU 19.

At the following step S20, it is determined whether the electric power needs be supplied to the first and second electric heaters 53a, 53b based on the target outlet air temperature and the relevant signals. Also at step S20, if it is determined that the electric power needs to be supplied to the first and second electric heaters 53a, 53b, the necessary heater electric power HO is computed.

Next, at step S30, it is determined whether the power source voltage Vin is greater than the heater stop voltage Vh. If "YES" is returned at step S30, control moves to step S40. At step S40, the second duty ratio HOduty2 is adjusted to 0%. Thus, the power supply to the first and second heaters 53a, 53b is prohibited by the operations at steps S90–S110, which will be described in greater detail below. As a result, the first and second electric heaters 53a, 53b are protected from the excessively high voltage, restraining deterioration of the durability of the first and second electric heaters 53a, 53b.

On the other hand, if it is determined that the power source voltage Vin is equal to or less than the heater stop voltage Vh, and thus "NO" is returned at step S30, control moves to step S50. At step S50, the first duty ratio HOduty1 is computed.

If the power source voltage Vin is 350 V (>the rated voltage Vt), and the first and second electric heaters 53a, 53b are operated at the duty ratio of 100%, the sum of the electric power of the first electric heater 53a and the electric power of the second electric heater 53b is about 8 kW, which is greater than the maximum heater electric power Ht. This will cause deterioration of the durability of the first and second electric heaters 53a, 53b.

Thus, at step S50, in order to always maintain the sum of the electric power of the first electric heater 53a and the electric power of the second electric heater 53b at a level equal to or less than the maximum heater electric power Ht regardless of the power source voltage Vin, the duty ratio (=the first duty ratio HOduty1) is computed with the following equation 1.

$$HOduty1 = (Vt/Vin)^2 * (HO/Ht) * 100\%$$

If the necessary heater electric power HO is 6 kW, and the power source voltage Vin is 350 V, the first duty ratio HOduty1 (about 73%) is obtained with the above equation 1. When the first and second electric heaters 53a, 53b are operated at the duty ratio of 73%, the sum of the electric power of the first electric heater 53a and the electric power of the second electric heater 53b becomes substantially equal to the maximum heater electric power Ht.

Then, the duty ratio of the first and second electric heaters 53a, 53b is limited to the first duty ratio HOduty1 or less through the operations at steps S90–S110, which will be described below. Thus, the deterioration of the durability of the first and second electric heaters 53a, 53b is restrained.

After step S50, a second duty ratio HOduty2 for protecting the fuse 70 is computed through steps S60–S80. Specifically, the electric current, which passes through the fuse 70, is computed, and the computed electric current is compared with the tolerable fuse electric current Id to compute the second duty ratio HOduty2.

First, if the first duty ratio HOduty1 is equal to or less than 50%, "YES" is returned at step S60, and control moves to step S70.

As described above, the phase of the duty control of the second electric heater 53b is delayed by the one half of the period from the phase of the duty control of the first electric heater 53a. Thus, when the duty ratio is equal to or less than 50%, the maximum sum of the electric current of the first electric heater 53a and the electric current of the second electric heater 53b becomes equal to the electric current of the first electric heater 53a (=the electric current of the second electric heater 53b). As a result, when the duty ratio is equal to or less than 50%, the maximum electric current, which passes through the fuse 70, is the sum of the electric current of one electric heater 53a or 53b and the compressor electric current Ic.

Thus, at step S70, the sum of the electric current (=Vin/R) of the one electric heater and the compressor electric current Ic is compared with the tolerable fuse electric current Id. If the sum of the electric current of the one electric heater and the compressor electric current Ic is equal to or greater than the tolerable fuse electric current Id (i.e., Vin/R+Ic≧Id), the second duty ratio HOduty2 is adjusted to 0%. Thus, in the following steps S90–S110, the supply of the electric power to each of the first and second electric heaters 53a, 53b is prohibited to protect the fuse 70.

If the sum of the electric current of the one electric heater and the compressor electric current Ic is less than the tolerable fuse electric current Id (i.e., Vin/R+Ic<Id), it is determined that the supply of the electric power to the one electric heater is allowed, and the second duty ratio HOduty2 is adjusted to the first duty ratio HOduty1 (i.e., HOduty2=HOduty1).

On the other hand, if the first duty ratio HOduty1, which is computed at step S50, is greater than 50%, "NO" is returned at step S60, and control moves to step S80.

Then, at step S80, if the sum of the electric current of the one electric heater and the compressor electric current Ic is equal to or greater than the tolerable fuse electric current Id (i.e., Vin/R+Ic≧Id), the second duty ratio HOduty2 is adjusted to 0%. Thus, through the operations of the following steps S90–S110, the supply of the electric power to each of the first and second electric heaters 53a, 53b is prohibited to protect the fuse 70.

Alternatively, at step S80, if the sum of the electric currents of the two electric heaters (=2*Vin/R) and the compressor electric current Ic is equal to or greater than the tolerable fuse electric current Id (i.e., 2*Vin/R+Ic≧Id), and the sum of the electric current of the one electric heater and the compressor electric current Ic is less than the tolerable fuse electric current Id (i.e., Vin/R+Ic<Id), the second duty ratio HOduty2 is adjusted to 50%. Thus, through the operations of the following steps S90–S110, the duty ratio of the first and second electric heaters 53a, 53b is limited to 50% or less, so that the electric current, which passes through the fuse 70, is limited to the tolerable fuse electric current Id or less.

Also, at step S80, if the sum of the electric currents of the two electric heaters (=2*Vin/R) and the compressor electric current Ic is less than the tolerable fuse electric current Id (i.e., 2*Vin/R+Ic<Id), it is determined that the power supply to the two electric heaters is allowed, and the second duty ratio HOduty2 is adjusted to the first duty ratio HOduty1 (i.e., HOduty2=HOduty1).

Then, control moves from any one of steps S40, S70 and S80 to step S90. At step S90, the required electric power HOreq is computed with the following equation 2.

$$HOreq = (HOduty2/100) * Ht * (Vin/Vt)^2 + Vt * Ic$$

Information of this computed value HOreq is outputted to the vehicle ECU 60. Upon receiving the information of the required electric power HOreq, the vehicle ECU 60 outputs information of the allowed electric power W, which is determined in view of the vehicle side electric power load, to the air-conditioning ECU 19.

In the above second equation, $(HOduty2/100)*Ht*(Vin/Vt)^2$ is the heater electric power, which is obtained by controlling the first and second electric heaters 53a, 53b at the second duty ratio HOduty2.

At step S100, the allowed heater electric power HOok is computed by subtracting the compressor electric power from the allowed electric power W. The usable heater electric power HOf is chosen to be the smallest one of the following: (1) the necessary heater electric power HO, (2) the allowed heater electric power HOok, and (3) the electric power (=HOreq−Vt*Ic), which is obtained by subtracting the compressor electric power from the required electric power HOreq.

Next, at step S110, the target duty ratio HOduty is computed with the following equation 3.

$$HOduty = (Vt/Vin)^2 * (HOf/Ht) * 100\%$$

The first and second electric heaters 53a, 53b are operated at the computed target duty ratio HOduty. The actual heater electric power, which is obtained when the first and second electric heaters 53a, 53b are operated at the target duty ratio HOduty, coincides with the usable heater electric power HOf.

When the second duty ratio HOduty2 is set to 0% at any one of steps S40, S70 and S80, the required electric power HOreq computed at step S90 becomes equal to the compressor electric power, so that the electric power obtained by subtracting the compressor electric power from the required electric power HOreq becomes zero, and the usable heater electric power HOf determined at step S100 also becomes zero. Thus, the target duty ratio computed at step S110 becomes zero, and the first and second electric heaters 53a, 53b are powered off.

If the second duty ratio HOduty2 is set to 50% at step S80, the target duty ratio HOduty computed at step S110 becomes equal to or less than 50% regardless of the result of the determination of the usable heater electric power HOf at step S100.

In the present embodiment, the electric current, which passes through the fuse 70, is computed based on the voltage (=the applied voltage to the first and second electric heaters 53a, 53b) of the battery 17 measured with the voltage sensing circuit 18d of the inverter 18, and thus the electric current, which passes through the fuse 70, is limited to the tolerable fuse electric current of the fuse 70 or less. As a result, even if the voltage of the battery 17 becomes relatively high, blowing of the fuse 70 is restrained.

Furthermore, in the present embodiment, the phase of the duty control of the second electric heater 53b is delayed by the one half of the period from the phase of the duty control of the first electric heater 53a. Thus, in the case of the duty ratio equal to or less than 50%, when the electric power is supplied to one of the first and second heaters 53a, 53b, the electric power is not supplied to the other of the first and second heaters 53a, 53b. Thus, the maximum sum of the electric current of the first electric heater 53a and the electric current of the second electric heater 53b, which is obtained with the provision of the phase delay of the duty control, becomes the one half of the maximum sum of the electric current of the first electric heater 53a and the electric current of the second electric heater 53b, which is obtained without the provision of the phase delay of the duty control. As a result, the electrical current, which has passed through the fuse 70, becomes smaller, and thus the blowing of the fuse can be more effectively restrained. Also, the electric current, which passes through the inverter 18, becomes smaller, so that heat generation in the inverter 18 can be reduced.

Furthermore, the phase of the duty control of the second electric heater 53b is delayed by the one half of the period from the phase of the duty control of the first electric heater 53a. Thus, in the case of the duty ratio greater than 50%, the change in the sum of the electrical current of the first electric heater 53a and the electrical current of the second electric heater 53b becomes equal to the electrical current of the first electric heater 53a or of the second electric heater 53b. This is one half of the corresponding value, which is obtained without the provision of the phase delay of the duty control. Thus, the reduced change in the electric current results in a reduced change in the voltage of the battery 17. As a result, malfunction or deterioration of the durability of other electric load induced by the change in the battery voltage can be restrained.

A rotational speed of the electric compressor 16 only gradually increases when the supply of the electric power is resumed after the termination of the supply of the electric power. However, the first and second electric heaters 53a, 53b, which are resistance loads, can achieve its maximum performance within a shorter period of time when the supply of the electric power is resumed after the termination of the supply of the electric power. In the present embodiment, when it is determined that the sum of the compressor electric current and the heater current exceeds the tolerable electric current of the fuse 70, the supply of the electric power to each of the first and second electric heaters 53a, 53b, which show the fastest operational response, is first terminated prior to the termination of the supply of the electric power to the electric compressor 16. Thus, a predetermined performance can be achieved immediately when the supply of the electric power is resumed.

The control operation shown in FIG. 4 is carried out even when the supply of the electric power to the first and second heaters 53a, 53b is stopped. Thus, when it is determined that the electric power needs to be supplied to the first and second electric heaters 53a, 53b, the electric current (predicted electric current) to be supplied to the first and second electric heaters 53a, 53b are computed based on the voltage to be applied to the first and second electric heaters 53a, 53b. Based on the sum of the predicted electric current to be supplied to the first and second electric heaters 53a, 53b and the compressor electric current Ic, the electric current to be passed through the fuse 70 is computed. Then, before the electric current is supplied to the first and second electric heaters 53a, 53b, it is determined whether the electric current to be passed through the fuse 70 is greater than the tolerable electric current of the fuse 70. In this way, the blowing of the fuse can be effectively restrained.

Modifications of the present embodiment will be described.

In the above embodiment, the sheathed heaters are used as the first and second electric heaters 53a, 53b. However, the electric heaters 53a, 53b can be any electric heaters, which generate heat upon energization thereof. For example, each first and second electric heater 53a, 53b can be a PTC heater that has a PTC heater element.

In the above embodiment, the coolant is heated by the first and second electric heaters 53a, 53b, and the conditioning air is heated by the heat released from the coolant through the heater core 13. Instead of placing the first and second electric heaters 53a, 53b in the second coolant circuit 50, the first and second electric heaters 53a, 53b can be placed adjacent the heater core 13 within the air duct 10. Then, when the amount of the heat released from the heater core 13 for heating the conditioning air is reduced below the required amount, the first and second heaters 53a, 53b can be used to directly heat the conditioning air.

In the above embodiment, the two electric loads (i.e., the two electric heaters 53a, 53b) are powered on at different time points and are powered off at different time points. Alternatively, three or more electric loads (e.g., the two electric heaters 53a, 53b, the electric compressor 16 and the drive motor of the blower 11) can be powered on at different time points and can be powered off at different time points. For example, in the case of three electric loads, all the three electric loads can be powered on at different time points and can be powered off at different time points. Alternatively, two of the three electric loads can be powered on at the same time and can be powered off at the same time.

In the above embodiment, the conditioning air is cooled in the refrigeration cycle, which includes the electric compressor 16 and the evaporator 12. Alternatively, the present invention can be applied to a refrigeration cycle that constitutes a heat pump cycle, which can switch its operation between a cooling operation and a heating operation.

Additional advantages and modifications will readily occur to those skilled in the art. The invention in its broader terms is therefore, not limited to the specific details, representative apparatus, and illustrative examples shown and described.

What is claimed is:

1. An electric load control system, which charges a battery with electric power generated by an electric power generating means and supplies electric power from the battery to a plurality of electric loads through a fuse, the electric load control system comprising a control means, which controls a supply of the electric power to each of the electric loads such that an electric current to the fuse is equal to or less than a tolerable electric current level of the fuse, wherein the supply of the electric power to each of the electric loads is duty controlled by the control means in such a manner that a period of duty control operation is the same for all of the electric loads, and the supply of the electric power to one of the electric loads is phase shifted from the supply of the electric power to another one of the electric loads.

2. An electric load control system according to claim 1, wherein when the control means determines that the electric current to the fuse exceeds the tolerable electric current level of the fuse, the control means stops the supply of the electric power to one of the electric loads, which shows a fastest operational response within the electric loads upon initiation of the supply of the electric power.

3. An electric load control system according to claim 2, wherein:
   the control means computes the electric current to the fuse based on a power source voltage and a resistance of each of the electric loads; and
   the control means determines whether the electric current to the fuse exceeds the tolerable electric current level of the fuse by comparing the electric current to the fuse computed by the control means with the tolerable electric current level of the fuse.

4. An electric load control system according to claim 1, wherein the control means computes the electric current to the fuse before it is actually supplied to the electric loads based on at least one electric characteristic of each of the electric loads and a voltage to be applied to each of the electric loads.

5. An electric load control system according to claim 4, wherein when the control means determines that the electric current to the fuse computed by the control means exceeds the tolerable electric current level of the fuse, the control means stops the supply of the electric power to one of the electric loads.

6. An electric load control system according to claim 5, wherein the one of the electric loads, to which the supply of the electric power is stopped, shows a fastest operational response within the electric loads upon initiation of the supply of the electric power.

7. An electric load control system according to claim 1, wherein:
the electric loads include at least one electric heater and an electric compressor of an air conditioning system of a vehicle;
the at least one electric heater heats conditioning air to be blown into a passenger room of the vehicle; and
the electric compressor compresses refrigerant used for cooling and heating the conditioning air.

8. An electric load control system according to claim 1, wherein the supply of the electric power to the one of the electric loads is duty controlled at the same duty ratio as that of the supply of the electric power to the other one of the electric loads.

9. An electric load control system, which charges a battery with electric power generated by an electric power generating means and supplies electric power from the battery to a plurality of electric loads, the electric load control system comprising a control means, which controls a supply of the electric power to each of the electric loads, wherein the supply of the electric power to each of the electric loads is duty controlled by the control means in such a manner that a period of duty control operation is the same for all of the electric loads, and the supply of the electric power to one of the electric loads is phase shifted from the supply of the electric power to another one of the electric loads, so that each power-on time and each power-off time of the one of the electric loads are shifted from each corresponding power-on time and each corresponding power-off time of the other one of the electric loads, respectively.

10. An electric load control system according to claim 9, wherein:
the electric loads include a plurality of electric heaters of an air conditioning system of a vehicle; and
the electric heaters heat conditioning air to be blown into a passenger room of the vehicle.

11. An air-conditioning system of a vehicle comprising:
a plurality of electric loads; and
an electric load control system, which charges a battery of the vehicle with electric power generated by an electric power generating means of the vehicle and supplies electric power from the battery to the electric loads through a fuse, wherein the electric load control system includes a control means, which controls a supply of the electric power to each of the electric loads such that an electric current to the fuse is equal to or less than a tolerable electric current level of the fuse, wherein the supply of the electric power to each of the electric loads is duty controlled by the control means in such a manner that a period of duty control operation is the same for all of the electric loads, and the supply of the electric power to one of the electric loads is phase shifted from the supply of the electric power to another one of the electric loads.

12. An air-conditioning system according to claim 11, wherein the electric loads include:
at least one electric heater, which heats conditioning air to be blown into a passenger room of the vehicle; and
an electric compressor, which compresses refrigerant used for cooling and heating the conditioning air.

13. An air-conditioning system of a vehicle comprising:
a plurality of electric loads; and
an electric load control system, which charges a battery of the vehicle with electric power generated by an electric power generating means of the vehicle and supplies electric power from the battery to the electric loads, wherein the electric load control system includes a control means, which controls a supply of the electric power to each of the electric loads, wherein the supply of the electric power to each of the electric loads is duty controlled by the control means in such a manner that a period of duty control operation is the same for all of the electric loads, and the supply of the electric power to one of the electric loads is phase shifted from the supply of the electric power to another one of the electric loads, so that each power-on time and each power-off time of the one of the electric loads are shifted from each corresponding power-on time and each corresponding power-off time of the other one of the electric loads, respectively.

14. An air-conditioning system according to claim 13, wherein the electric loads include a plurality of electric heaters, which heat conditioning air to be blown into a passenger room of the vehicle.

* * * * *